United States Patent [19]

Meske, Jr. et al.

[11] Patent Number: 5,530,852

[45] Date of Patent: Jun. 25, 1996

[54] METHOD FOR EXTRACTING PROFILES AND TOPICS FROM A FIRST FILE WRITTEN IN A FIRST MARKUP LANGUAGE AND GENERATING FILES IN DIFFERENT MARKUP LANGUAGES CONTAINING THE PROFILES AND TOPICS FOR USE IN ACCESSING DATA DESCRIBED BY THE PROFILES AND TOPICS

[75] Inventors: Carl F. Meske, Jr., San Jose; Philip J. Hooper, Santa Clara; Mark R. Opperman, Palo Alto, all of Calif.

[73] Assignee: Sun Microsystems, Inc., Mountain View, Calif.

[21] Appl. No.: 361,992

[22] Filed: Dec. 20, 1994

[51] Int. Cl.$^6$ .................................................. G06F 17/30
[52] U.S. Cl. ............... 395/600; 395/200.03; 395/200.09; 395/500; 395/700; 364/DIG. 1; 364/280.4; 364/280.6; 364/282.4
[58] Field of Search ................... 395/200.03, 200.09, 395/500, 600, 700

[56] References Cited

U.S. PATENT DOCUMENTS 5,291,602 3/1994 Barker et al. ............................ 395/700
5,299,304 3/1994 Williams et al. ....................... 395/148

OTHER PUBLICATIONS

MCI Telecommunications, Inc., *Network MCI Business*, Pamphlet, Marketing Information (Oct. 1994).
Berners–Lee, T. and Daniel Connolly, *Hypertext Markup Language*, 1–36, Jun. 1993.
Berners–Lee, T., and Daniel *Hypertext Transfer Protocol*, 1–25, Jun. 1993.
Author Unknown, *A Beginner's Guide to HTML*, 1–14, Jun. 1993.
Haycox, J., "SGML as a Basis for an Intelligent Data Management System", IEEE, 1993, pp. 1017–1020.
Mamrak et al., "Benifits of Automating Data Translation", IEEE, Jul./1993, pp. 82–88.

*Primary Examiner*—Thomas G. Black
*Assistant Examiner*—John C. Loomis
*Attorney, Agent, or Firm*—Blakely, Sokoloff, Taylor & Zafman

[57] ABSTRACT

A computer-implemented method and system for of retrieving information. A first file of information is received which includes a first markup language to identify contents of the information. Responsive to the receiving the first file of information, the first file of information is parsed to generate a list of profiles, and at least one corresponding topic for each of the list of profiles. A second file in a second markup language is created containing the list of the profiles and at least one corresponding third file is created in a third markup language for the at least one corresponding topic for each of the list of profiles. The second file contains anchors referencing each at least one corresponding third file, and first markup instances in the first file of information are converted to second markup instances in either the second file or the third file. The first file of information is parsed to determine the at least one article, if any, for the each at least one corresponding topic for the each of the list of profiles, and a corresponding brief for the at least one article. A fourth file and a fifth file are generated for the at least one article, if any, for the each at least one corresponding topic for the each of the list of profiles. The fourth file includes a brief of each the at least one article in the first file of information and an anchor to the fifth file, the fifth file including text for the at least one article, if any, for the each at least one corresponding topic for the each of the list of profiles.

12 Claims, 19 Drawing Sheets

First!

Welcome to First!

910

This is a searchable index. Enter search keywords: [        ]

- Comments, Questions about this Service?

Contents

- Additional and Enhanced Telecom Services
- CPE Equipment and Services
- Comm Software
- Computer Systems
- Corporate Watch
- EMG News
- Executive News
- First! for EHS
- Government Tracking
- High Technology Financial News
- International Telecom
- Internet Watch
- Long Distance Telecom
- Miscellaneous Telecom Interests
- Multimedia
- Networking
- Peripherals
- Security Group
- Semiconductors
- SunExpress News

First!  Welcome to First!

This is a searchable index. Enter search keywords: ☐ /1010

Additional and Enhanced Telecom Services /1020

- 800 and 900 Services /1021
- Advanced Intelligent Networks /1022
- Caller ID
- Calling Card  ~1023
- FAX Services
- Long Distance Business Services
- Pay Telephone Equipment and Services
- Telco Information Sevices
- Videoconferencing
- Voice Processing CPE Equipment and Services /1030
- 800 and 900 Services /1031
- Telemanagement and Call Center Comm Software
- Client-Server

Fig. 10

Intel_news —1100

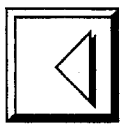 1101 Previous Topic
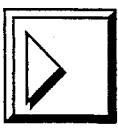 1102 Next Topic
 1103 Return to Profile Page

12/13/94 —1110

1111

Replacement Pentiums —1121
 Hewlett-Packard Co. said Wednesday it will provide replacement microprocessors for customers who have technical problems with the Pentium chip used in Hewlett computers.

1112

Intel hires exterminators to kill Pentium bug
 SAN JOSE, California-Intel Corp. said it will work with software experts to short-circuit the bug in its Pentium microprocessor. Richard Wirt, an Intelnd the error.

****Internet Backlash on Pentium Flaw
 Intel Corporation, which makes the Pentium processor, is being besieged by angry buyers after an American mathematician discovered a flaw in the chip's "floating point unit."

Pentium Jokes from the Internet
 Intel's Pentium woes have spawned a batch of new jokes on the Internet and other online systems. A sampling: Q: What is the successor to RU-486 birth control drug?

San Jose Mercury News, Calif., Dan Gillmor Column
 PENTIUM ISSUE HAS BUGGED LOTS OF READERS: Want to get lots of mail, phone calls and faxes? Take one of Silicon Valley's major icons to task in print.

When Customer Complaint Hits the Internet, Even Intel Must Listen
 Thomas Nicely just couldn't make the numbers work. On June 13, after running billions of calculations on his Pentium computer, the Lynchburg College math professor discovered the numbers didn't divide right.

Cyrix says court rule in favor vs. Intel
 Cyrix Corp said that a district court has ruled that International Business Machines Corp may manufacture microprocessors for Cyrix under IBM's patent cross license with Intel Corp.

Intel shares off IBM decision to halt
 Intel Corp shares fell sharply in heavy trading after International Business machines Corp announced it would halt shipments of personal computers

Fig. 11A made with Intel's Pentium chip, analysts said.

Dell has no halt shipping Pentium
   Dell Computers Corp said it has no plans to halt shipments of its
   Pentium-based personal computers because of the previously announced flaw
   in the chip and it added that demand for Pentium-based PCs remains strong.

Intel CEO to speak to analyst 1700 EST
   Intel Corp chief executive office Andrew Grove will hold a telephone conference
   call with analysts and some reporters at 1700 EST/2200 GMT, Intel said.

CompUSA Pentium PC sales not yet hit by flaw
   CompUSA Inc said it has not demand for its Pentium-based PCs remains heavy,
   with sales apparently unaffected by recent reports of the flaw in the Intel
   Corp chip.

Intel does not see a Q4 charge from flaw
   Intel Corp does not expect to take a charge against fourth-quarter earnings
   because of any repercussions from the flaw discovered in its Pentium chip,
   said Andrew Grove, chief executive officer.

IBM HALTS SHIPMENTS OF PENTIUM-BASED PERSONAL COMPUTERS BASED ON COMPANY RESEARCH
   IBM HALTS SHIPMENTS IF PENTIUM-BASED PERSONAL COMPUTERS BASED
   ON COMPANY RESEARCH-IBM today announced it has stopped shipment if all
   IBM personal computers based on the Intel Pentium microprocessor.

Intel says IBM shipment halt is unwarranted
   In response to an IBM press release, Intel reiterated that it has studied the
   Pentium processor flaw for months and has concluded that the frequency of
   encountering reduced precision in floating point divide operations is once in
   every 9 billion random divide operations.

---

12/12/94 — 1

- Intel Announces New Chip Plant — 1130
- Va. Professor Found Chip Error — 1131
- INTEL TARGETS PENTIUM AT EUROPEAN HOME EDUCATION MARKET
- PC vendors grapple with FPU support-Many telling customers to call Intel.

Fig. 11B

- Intel's P24T delayed
- Intel Improves Windows Support in Fax Boards
- Intel Track Record Suffers Another Blow
- Software Vendors Look To Repel Pentium FPU Bug

1140

Previous Week's News

Copyright by first!

newsfeed

Enter keyword(s):   | solaris | ⎯ 1200 newsfeed contains the following items relevant to 'solaris':

0:Score=1000 Date=9/16/94   ⎯ 1201

<u>Seybold - SunSoft In Document Viewer Deal</u>   ⎯ 1202
        From Seybold '94, Electronic Book Technologies and SunSoft have
announced an agreement to create a universal document viewer for   ⎯ 1203
Solaris users.

1:Score=1000 Date=9/7/94

<u>SunSoft ships Netware Protocol Service for Solaris</u>
        SunSoft Inc. today began shipping PC Protocol services, a set of
services for IPX/SPX compatible-access into the Solaris operating
environment.

2:Score=994 Date=9/16/94

<u>Seybold - SunSoft In Document Viewer Deal</u>
        From Seybold '94, Electronic Book Technologies and SunSoft have
announced an agreement to create a universal document viewer for
Solaris users.

3:Score=990 Date=9/7/94

<u>Sunsoft ships Netware Protocol Service for Solaris</u>
        SunSoft Inc. today began shipping PC Protocol services, a set of
services for IPX/SPX compatible-access into the Solaris
operating environment.

4: Score=990 date=9/7/94

<u>Sunsoft ships Netware Protocol Service for Solaris</u>
        SunSoft Inc. today begun shipping PC Protocol services, a set of
services for IPX/SPX compatible-access into the Solaris operating
environment.

5:Score=990 Date=9/7/94

Fig. 12A

Sunsoft ships Netware Protocol Service for Solaris
Sunsoft Inc. today began shipping PC Protocol services, a set of services for IPX/SPX compatible-access into the Solaris operating environment.

6: Score=975 Date 11/15/94

ED ZANDER, SUNSOFT PRESIDENT, TALKS ABOUT OBJECTS
After releasing Solaris 2.4 last month, Sunsoft Inc. is racing to beat competitors that are implementing object-oriented technology in operating systems.

7:Score=972 Date=9/7/94

Sunsoft ships Netware Protocol Service for Solaris
Sunsoft Inc. today began shipping PC Protocol services, a set of services for IPX/SPX comaptible-access into the Solaris operating environment.

8:Score=957 Date=11/15/94

ED ZANDER, SUNSOFT PRESIDENT, TALKS ABOUT OBJECTS
After releasing Solaris 2.4 last month, SunSoft Inc. is racing to beat competitors that are implementing object-oriented technology in operating systems.

9:Score=957 Date 11/22/94

PLASMON PORTS MANAGER TO THREE OSS
Plasmon Data Systems, of Milpitas, CA is making its MANAGER jukebox integration and management software available for Windows for Workgroups, OS/2, and Solaris environments.

10:Score=939 Date=9/13/94

Amdahl and Sun Deliver High-Performance Enhancements for Solaris
Amdahl Corporation and Sun Microsystems Computer Company today introduced the first product created as a result of the Amdahl-Sun strategic alliance.

11:Score=939 Date=9/13/94

Amdahl and Sun Deliver High-Performance Enhancements for Solaris
Amdahl Corporation and Sun Microsystems Computer Company today introduced the first product created as a result of the Amdahl-Sun strategic alliance.

Fig. 12B

UK - NEC, VideoLogic Team On 3D Games ~1300

Date: 12-16-94
Source: Newsbytes ~1301
FileID:n1216161.805

~1302
LONDON, ENGLAND, 1994 DEC 16 (NB) via First! -- NEC of Japan and VideoLogic in the UK have teamed up to develop a new three-dimensional (3D) video graphics system that they claim will "revoltionize" video games and desktop multimedia PC systems.

The technology, which has been developed so far by VideoLogic and is known by the name Power VR (Power Virtual Reality), is being licensed to NEC so that both companies can develop firmware capable of supporting 3D and VR technology for the consumer marketplace. VideoLogic officials say that the technology should arrive in the marketplace by the end of 1995.

According to VideoLogic, PowerVR has been in development for more than three years and provides true photo quality pictures in animated form, giving the user a sense of 3D realism and special effects that no other computer systems can generate.

One of the most interesting features of PowerVR is that the graphics technology is scalable, meaning that even lowly 32-bit games systems can produce the effect, although, obviously, not at the same level of resolution as on dedicated 64-bit systems against which the PowerVR system is aimed.

VideoLogic officials say that making realistic computer games is only one step on the ladder of technology as far as PowerVR is concerned. They point out that industrial applications, such as "walk through" VR building designs and even VR cites on computer could be sculpted using the PowerVR technology.

"The Ultimate aim in the games market, and, in the PC applications market, is to increase the level of realism and interactivity. The fruits of our developments with NEC will move games and other PC virtual reality applications into new realms of quality," explained Derek MacLaren, VideoLogic's chairman, announcing the NEC licensing deal.

"Our goal is to remove the 'virtual' from the virtual reality so that users of out technology can feel like they are actually in Jurassic Park rather than just watching the movie," he said (Steve Gold/19941216/Press Contact: Andrew Smith, A plus Group +44-753-790700; Reader Contact: Kazuya Yoshida, NEC +44-71-353-4383; Neil Davison, VideoLogic +44-923+260511)

Profile: Multimedia
Topic: Virtual Reality

Fig. 13

METHOD FOR EXTRACTING PROFILES AND TOPICS FROM A FIRST FILE WRITTEN IN A FIRST MARKUP LANGUAGE AND GENERATING FILES IN DIFFERENT MARKUP LANGUAGES CONTAINING THE PROFILES AND TOPICS FOR USE IN ACCESSING DATA DESCRIBED BY THE PROFILES AND TOPICS

BACKGROUND OF THE INVENTION

1. Field of the Invention

The present invention relates to information retrieval. More specifically, the present invention relates to a client/server model for information retrieval which includes the receipt of a plurality of information organized by profile and topic in a first markup language, and the parsing of the plurality of information into portions of information in a second markup language, including anchors referencing each of the portions of information to allow hypertext viewing and accessing.

2. Background Information

The development of computerized information resources, such as the Internet, and various on-line services, such as Compuserve. America Online, Prodigy, and other services, has led to a proliferation of electronically-available information. In fact, this electronic information is increasingly displacing more conventional means of information transmission, such as newspapers, magazines, and even, television. The primary issue in all of these resources is filtering the vast amount of information which is available in order that a user obtain that information which is of interest to him.

Currently, a user who subscribes to one of the above-services, or uses the Internet, in some circumstances, manually scans through the various information resources in order to obtain articles, postings, or other files which are of interest. Typically, the user manually scans in areas or sources of interest (publications, USENET Newsgroups, fora, or other areas classified by topic) to find topic areas which may be of interest to the user. The user then retrieves articles or files which have subject headings, for example, matching those which the user wishes to read. For example, in USENET newsgroups on the Internet postings frequently have relevant subject headings to permit manual scanning. Article headings in newspapers/magazines serve similar functions. Thus, if the user does not wish to view those stories with products for sale, then he simply ignores those postings having the term "For Sale" in the subject heading. Finally, as a last level of filtering, the, user can read the stories which have been filtered by topic, and subject heading, and if anytime during the viewing of the story the user wishes to ignore the rest of the article, he can stop reading it and simply discard the story. If desired, the user can download the remaining stories in any number of prior art ways, for off-line viewing.

As is clearly evident, this manual scanning process which a user must engage in is very time-consuming. To some extent, news is already filtered for readers. Those that subscribe to certain magazines/newspapers, or view certain television networks, already have the vast base of electronically-available information (e.g. wire services) filtered for them. However, this "filtering" is performed on a large-scale basis, for a wide audience. The tailoring of specific stories of interest to particular users has not been performed. Thus, a need has arisen to automatically sort through the large variety of electronic sources in order to generate a subset of the stories available in electronic form which is tailored to a user's specific interests is desired.

Other services have recently become available. Some allow the retrieval of information via facsimile or other means, based upon user-specified parameters. Certain commercial services now provide a facsimile service to retrieve articles of interest based upon predefined profiles. These profiles include those grouped by company or by subject area. The articles of interest are retrieved using standard prior art techniques (e.g. boolean search terms). These services do not to a large extent, however, provide the information in digital form (e.g. on a user-interface display), nor do they allow the browsing of information which is retrieved from these sources.

Thus, the prior art of obtaining information from various sources suffers from several shortcomings.

SUMMARY

A computer-implemented method and system for of retrieving information. A first file of information is received which includes a first markup language to identify contents of the information. Responsive to the receiving the first file of information, the first file of information is parsed to generate a list of profiles, and at least one corresponding topic for each of the list of profiles. A second file in a second markup language is created containing the list of the profiles and at least one corresponding third file is created in a third markup language for the at least one corresponding topic for each of the list of profiles. The second file contains anchors referencing each at least one corresponding third file, and first markup instances in the first file of information are converted to second markup instances in either the second file or the third file. The first file of information is parsed to determine the at least one article, if any, for the each at least one corresponding topic for the each of the list of profiles, and a corresponding brief for the at least one article. A fourth file and a fifth file are generated for the at least one article, if any, for the each at least one corresponding topic for the each of the list of profiles. The fourth file includes a brief of each the at least one article in the first file of information and an anchor to the fifth file, the fifth file including text for the at least one article, if any, for the each at least one corresponding topic for the each of the list of profiles. In implemented embodiments, a sixth file can also be created which contains a plurality of anchors referencing a plurality of the fifth files, wherein the anchors in the sixth file are arranged by each the profile and corresponding topic. The first file of information can include receiving an electronic mail (e-mail message. The processing of the first file, and the creation of the additional files with the included anchors allows hypertext viewing and traversal of the processed information.

In another embodiment a computer-implemented method and apparatus for retrieving information includes using a hypertext transfer protocol to display to a user a display generated from a first markup language, containing a list a profiles, and at least one corresponding topic for each of the list of profiles. The user is allowed to select via the hypertext transfer protocol a first plurality of the at least one corresponding topic for a second plurality of the list of profiles. The user is allowed to enter via the hypertext transfer protocol at least one search term. A search is performed using the search term in a first database of information, the first database of information organized by the list of the profiles, and the at least one corresponding topic for each of the list of profiles. The search is performed in locations in the first database of information which correspond with each of the first plurality of the at least one corresponding topic for the second plurality of the list of profiles. Markup language files can be generated showing the results of the search. This search may include a FreeWAIS (inverted index) search of the parsed information.

BRIEF DESCRIPTION OF THE DRAWINGS

The present invention is illustrated by way of example and not limitation in the figures of the accompanying in which like references indicate like elements and in which:

FIGS. 9, 10, 11a, 11b, 11c, 12a, 12b and 13 shows various display screens for user control and showing the results of the processes illustrated in FIGS. 5a–5d and 7.

DETAILED DESCRIPTION

A portion of the disclosure of this patent document contains material which is subject to copyright protection and to which a claim of copyright protection is made. The owner has no objection to the facsimile reproduction by anyone of the patent disclosure, as it appears in the Patent and Trademark Office patent files or records, but otherwise reserves all copyrights and similar rights whatsoever.

The present invention is a method and apparatus for automatically creating hypertext documents from information using profiles and topics, and providing that information to a user. Although the following will be described with reference to certain particular embodiments, including data structures, flow of steps, hardware configurations, etc. . . , it will be apparent to one skilled in the art that implementations of the present invention can be practiced without these specific details.

Figure 1:
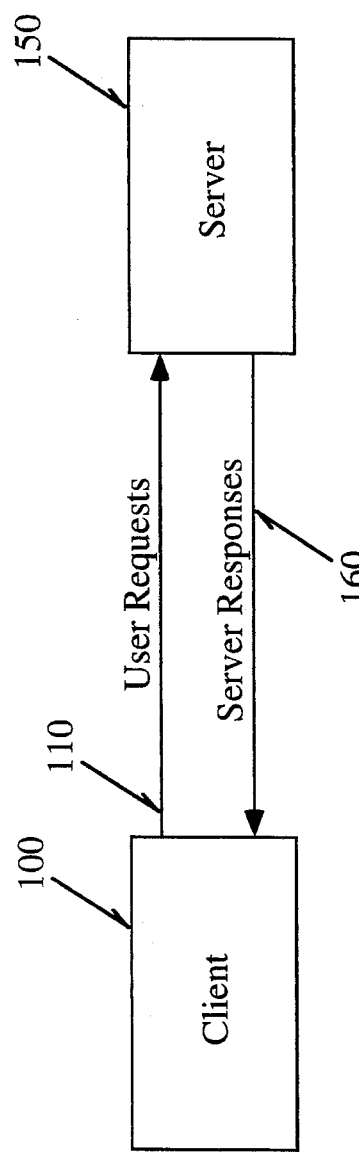
FIG. 1 shows a client/server system in which embodiments of the present invention may be implemented.

Implementations of the present invention use a client/server architecture, as illustrated in FIG. 1, wherein user requests 110 for news are sent by a client application program 100 to a server 150 (typically, a remote computer system accessible over the Internet or other communication medium). The server 150, as will be described in more detail below performs scanning and searching of raw (e.g. unprocessed) information sources (e.g. newswires feeds or newsgroups), based upon these user requests, presents the filtered electronic information as server responses 160 to the client process. The client process may be active in a first computer system, and the server process may be active in a second computer system, and communicate with one another over a communication medium, thus providing distributed functionality and allowing multiple clients to take advantage of the information gathering capabilities of the server.

Figure 2:
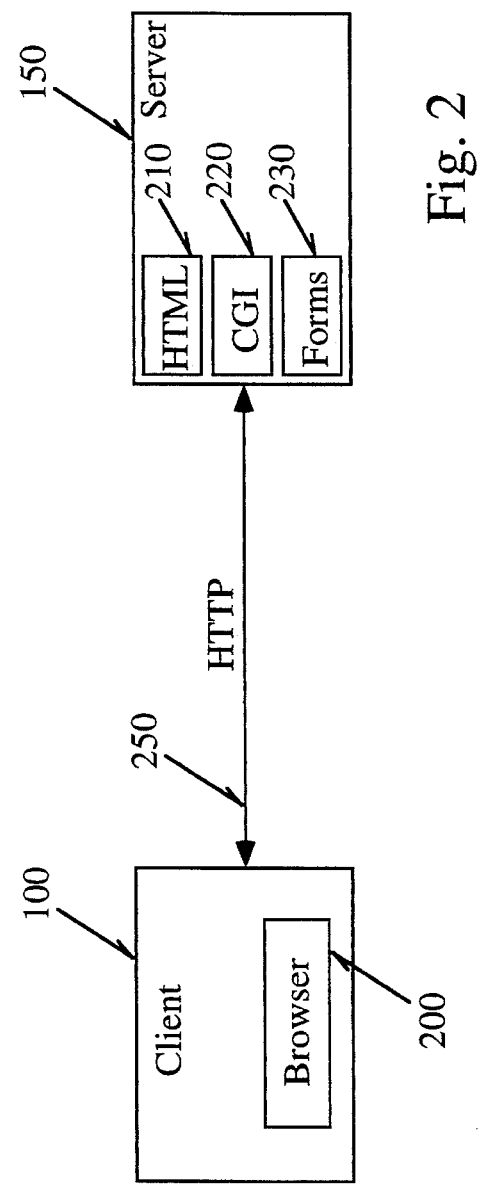
FIG. 2 shows a more detailed view of the client/server illustrated in FIG. 1.

A more detailed view of the client and server are shown in FIG. 2. Although the client and server are processes which are operative within two computer systems, these processes being generated from a high level programming language (e.g. PERL), which is interpreted and executed in a computer system at runtime (e.g. a workstation), it can be appreciated by one skilled in the art that they may be implemented in a variety of hardware devices, either programmed or dedicated.

Client 100 and server 150 communicate using the functionality provided by Hypertext Transfer Protocol (HTTP). The World Wide Web (WWW) or simply the "Web" includes all the servers adhering to this standard which are accessible to clients via Uniform Resource Locators (URL's). For example, communication can be provided over a communication medium 250. In some embodiments, the client and server may be coupled via Serial Line Internet Protocol (SLIP) or TCP/IP connections for high-capacity communication. Active within the client is a first process, known as a "browser" 200, which establishes the connection with server 150, and presents information to the user. Any number of commercially or publicly-available browsers may be used, in various implementations, however in this implementation, browser 200 is the Mosaic brand browser available from the National Center for Supercomputing Applications (NCSA) in Urbana-Champaign, Illinois. Other browsers such as the Netscape, Netcruiser, or the Lynx brand browsers, or others which are available and provide the functionality specified under HTTP and the Mosaic browser may be used.

The server 150 executes the corresponding server software which presents information to the client in the form of HTTP responses. The HTTP responses correspond with the Web "pages" represented using Hypertext Markup Language (HTML), or other data which is generated by the server, as will now be discussed.

Under the Mosaic brand browser, in addition to HTML functionality 210 provided by the server (display and retrieval of certain textual and other data based upon hypertext views and selection of item(s)), a Common Gateway Interlace (CGI) 220 is provided which allows the client program to direct the server to commence execution of a specified program contained within the server. This may include a search engine which scans received information in the server for presentation to the user controlling the client. Using this interface, and HTTP, the server may notify the client of the results of that execution upon completion.

In order to control the parameters of the execution of this server-resident process, the client may direct the filling out of certain "forms" from his browser. This is also provided by the "fill-in forms" functionality 230 available under Mosaic, which allows the user via his client application program 100, to specify search terms in which the server will cause an application program to function (e.g. terms contained in the types of stories/articles which are of interest to the user). The details of this searching mechanism will be discussed below.

Figure 3:
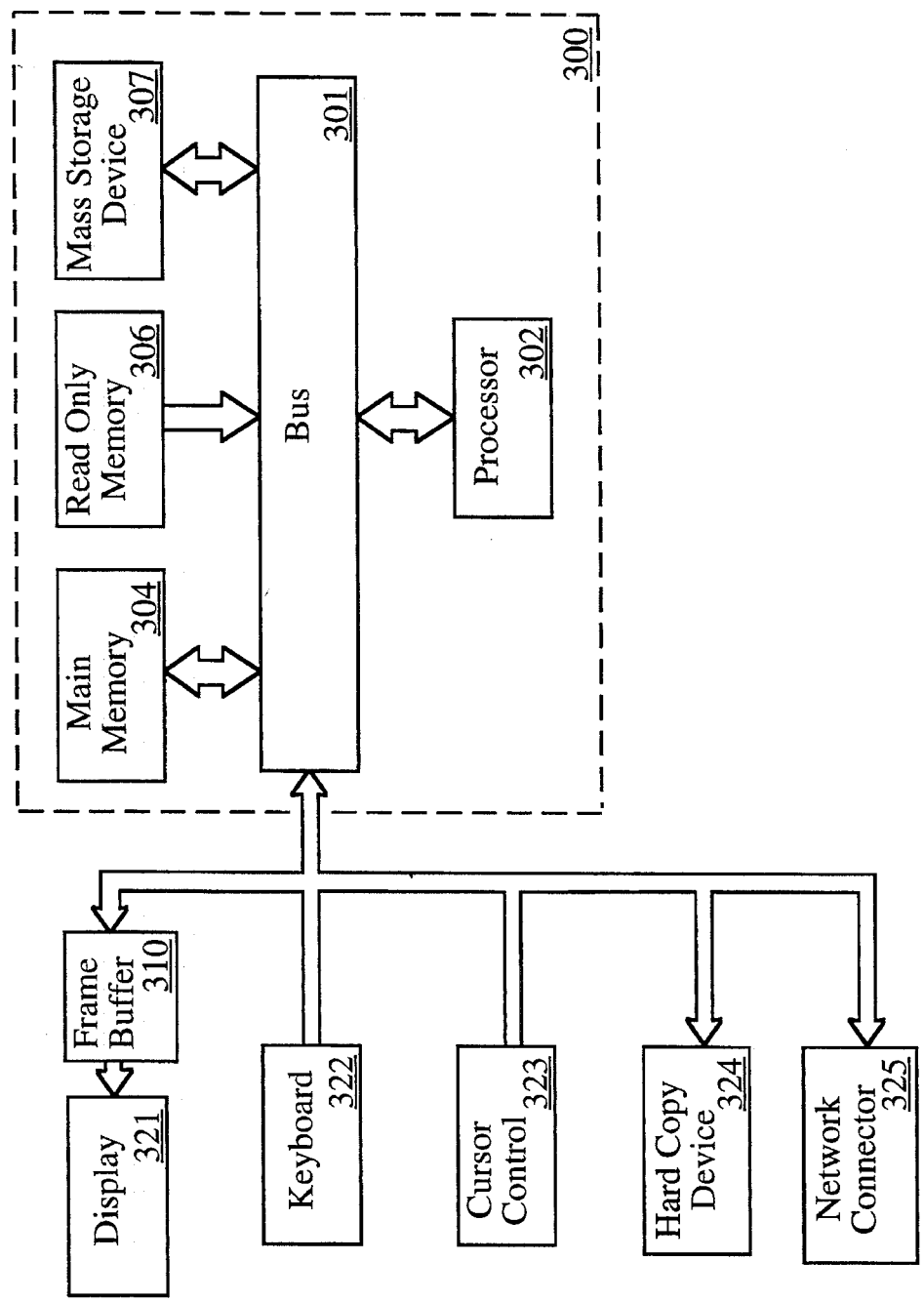
FIG. 3 shows the structure of a workstation in which the client or server may be operative.

A computer system, such as a workstation, personal computer or other processing apparatus in which the client 100 or server 150 may be operative is illustrated in FIG. 3. A workstation in which one implementation of the present invention may be practiced includes system 300. 300 comprises a bus or other communication means 301 for communicating information, and a processing means 302 coupled with bus 301 for processing information. System 300 further comprises a random access memory (RAM) or other volatile storage device 304 (referred to as main memory), coupled to bus 301 for storing information and instructions to be executed by processor 302. Main memory 304 also may be used for storing temporary variables or other intermediate information during execution of instructions by processor 302. System 300 also comprises a read only memory (ROM) and/or other static storage device 306 coupled to bus 301 for storing static information and instructions for processor 302, and a data storage device 307 such as a magnetic disk or optical disk and its corresponding disk drive. Data storage device 307 is coupled to bus 301 for storing information and instructions. This may be used for storage of the various files to be described here including profile, indices, topics, and article files.

System 300 may further be coupled to a display device 321, such as a cathode ray tube (CRT) or liquid crystal display (LCD) coupled to bus 301 for displaying information to a computer user. Such a display 321 may further be coupled to bus 301 via a frame buffer 310, which information such as a single or multiple frames or images for display upon display device 321. An alphanumeric input device 322, including alphanumeric and other keys, may also be coupled to bus 301 for communicating information and command selections to processor 302. An additional user input device is cursor control 323, such as a mouse, a trackball. stylus, or cursor direction keys, coupled to bus 301 for communicating direction information and command selections to processor 302, and for controlling cursor movement on display 321.

Note, also, that any or all of the components of system 300 and associated hardware may be used in various embodiments, however, it can be appreciated that any configuration of the system may be used for various purposes according to the particular implementation.

In one embodiment, system 300 is one of the Sun Microsystems® brand family of workstations such as the SPARCstation brand workstation manufactured by Sun Microsystems® of Mountain View, Calif. Processor 302 may be one of the SPARC brand microprocessors manufactured by Sun Microsystems®, Inc. of Mountain View, Calif.

Note that the following discussion of various embodiments discussed herein will refer specifically to a series of routines which are generated in a high-level programming language (e.g., the PERL interpretive language) which is interpreted and/or executed in system 300 at run-time. These further are used in conjunction with the browser and server software available from NCSA, as described above, including the specification of the appearance of displays in HTML. It can be appreciated by one skilled in the art, however, that the following methods and apparatus may be implemented in special purpose hardware devices, such as discrete logic devices, large scale integrated circuits (LSI's), application-specific integrated circuits (ASIC's), or other specialized hardware. The description here has equal application to apparatus having similar function.

Figure 4:
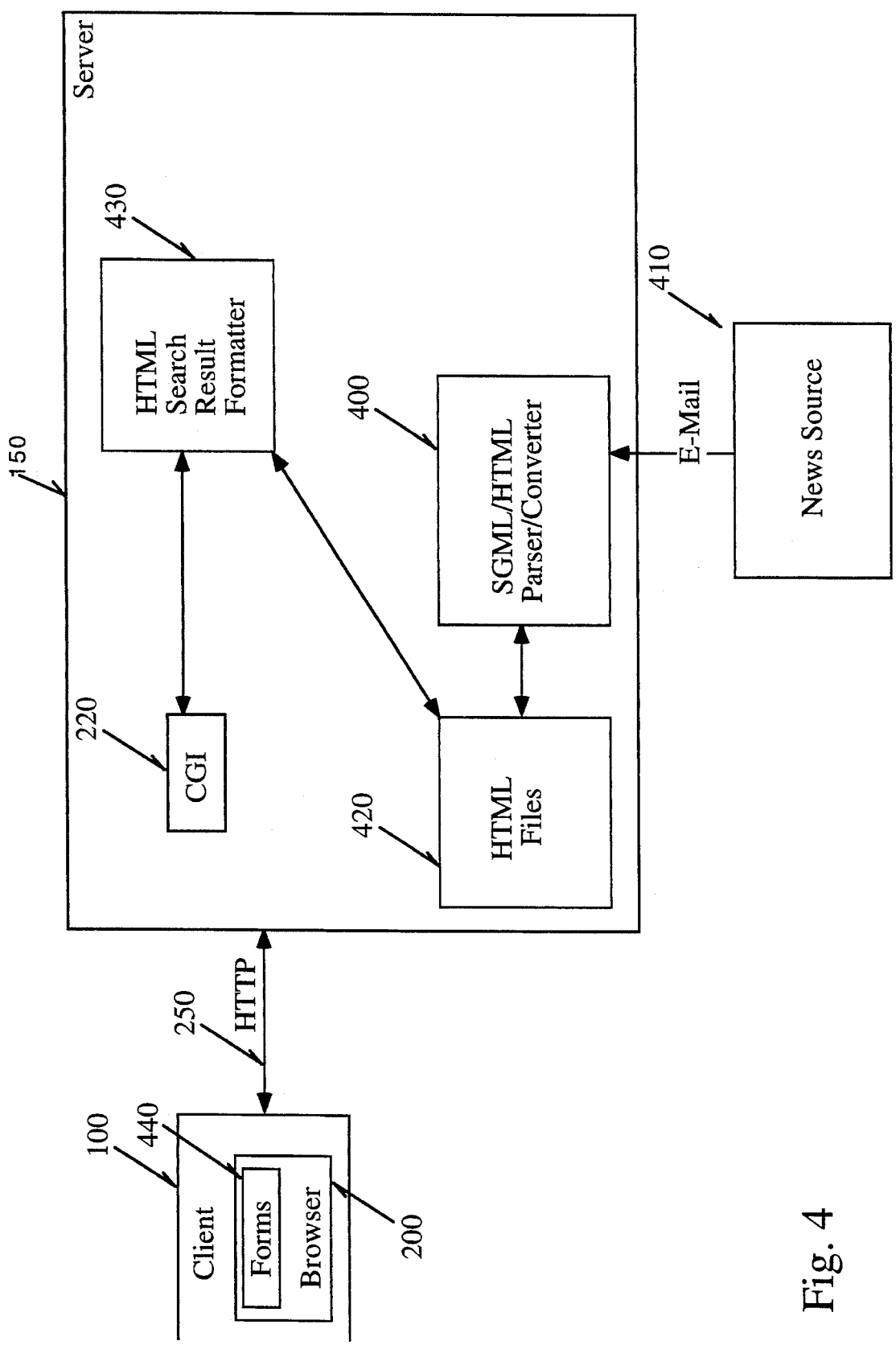
FIG. 4 shows a more detailed view of processes operative within the server.
Figure 5:
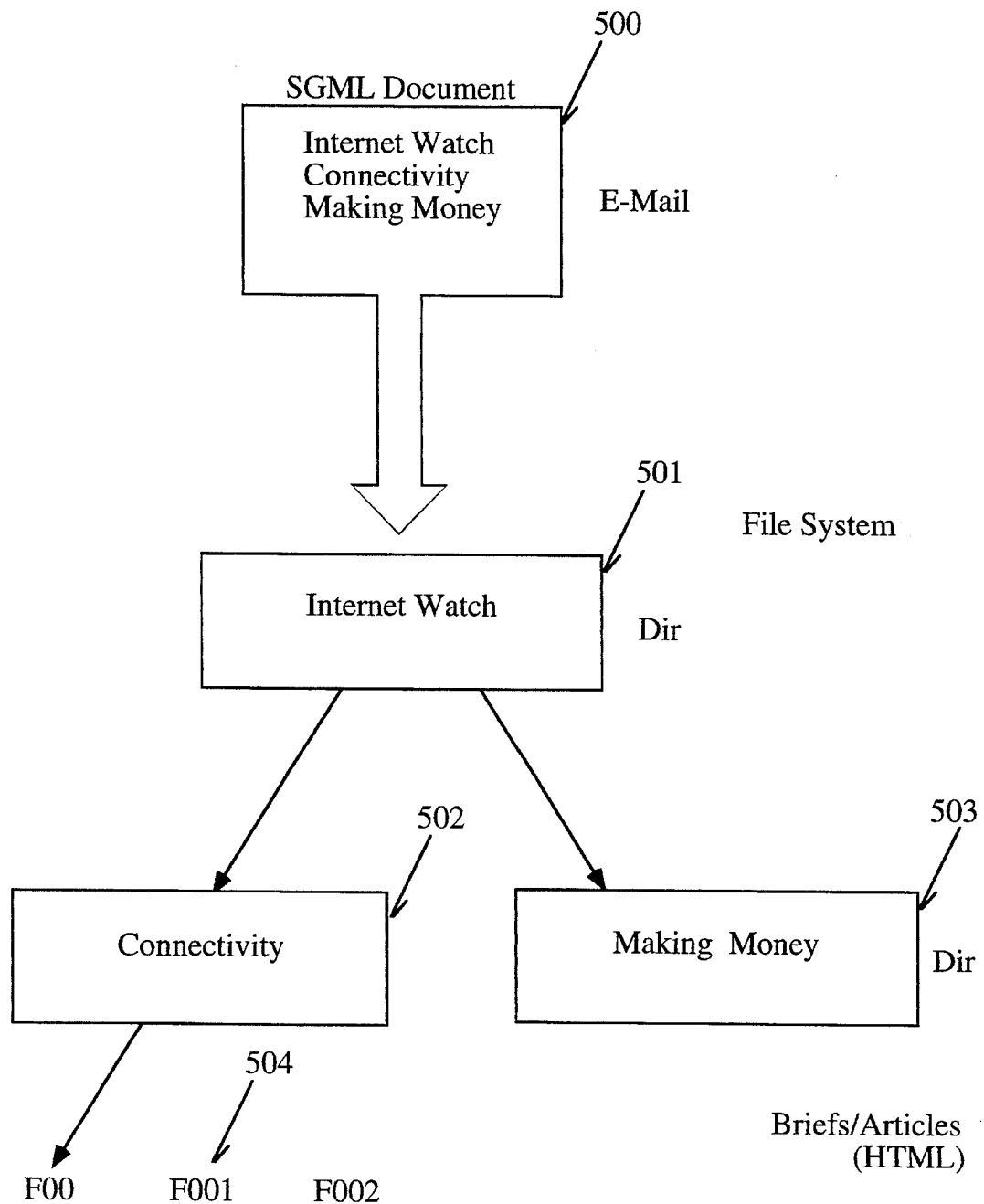
FIG. 5 shows an example of files which are processed in implemented embodiments of the present invention.

FIG. 4 shows in more detail the processes which form major components of implemented embodiments of the present invention. An SGML/HTML parser/converter process 400, implemented in PERL, communicates with the server via CGI 220, can process and respond to user requests for information, including search requests, in files which are resident upon the server. In addition, a search result formatter process 430 may also create certain HTML files 420 responsive to user search requests to perform a FreeWAIS search. The HTML versions of articles stored from the SGML mail message are searched for the presence of specified search terms, and additional HTML files created responsive thereto. The HTML results of these search requests can then be displayed on the client's console. In implemented embodiments, the HTML files 420 which are resident on the server are generated from an electronic mail (e-mail) message which is received from a second process, the news source 410. This process may be operative on yet another computer system and communicate with the server over a networking medium. In this implementation, the news source embeds within the e-mail message, Standard Generalized Markup Language (SGML) text which helps to identify and categorize the text. This is illustrated in FIG. 5. This is one implementation only, however, and other sources (e.g. USENET Newsgroups) may be used as a news source. In a In this implementation a news source provides an e-mail message at some predetermined time period to the server 210, and the HTML generator 400 parses the message, and creates HTML files which are made available during the client's session. The e-mail message contains embedded SGML text, which includes profile/topic(key) information. Of course, the text may be received in any number of descriptive/formatting languages. A profile, in this implementation, is one or many topics. For example, a profile list file may be entitled "Sun_Express_News.list" wherein a single profile name may be entitled "Direct Marketing." Keys (or topics) may be, for example, "Telemarketing" and "Catalog Sales." In another implementation, a profiles/topic may include a USENET newsgroup and subject heading. Individual topics, in this implementation, are generated via a search of large numbers of publications using heuristic techniques to obtain the topics and group them by profile. This front-end searching and categorization into profiles and topics is performed using a service available from Individual, Inc. Also, profiles are preset with specific topic(s) contained therein, although profiles and/or topics may be user-defined in other implementations.

A separate directory is used for storing each topic. As illustrated in FIG. 5 and 6b, a directory 501 representing a profile may be created (named "Internet Watch" in the example) is created, if required. If it already exists, then subdirectories (e.g. 502 and 503, named "Connectivity" and "Making Money") for the topic(s) contained within the profile also are present (and created, if required). Within each subdirectory, files are created (e.g. 504) which contained the parsed articles themselves contained within the e-mail message 500. Two types of files are stored for each article: a brief of the article; and the article itself. Briefs (a.k.a. abstracts) are used by the user during browsing of the results of the information retrieval to determine if a detailed review of the specific article is required.

Figure 6A:
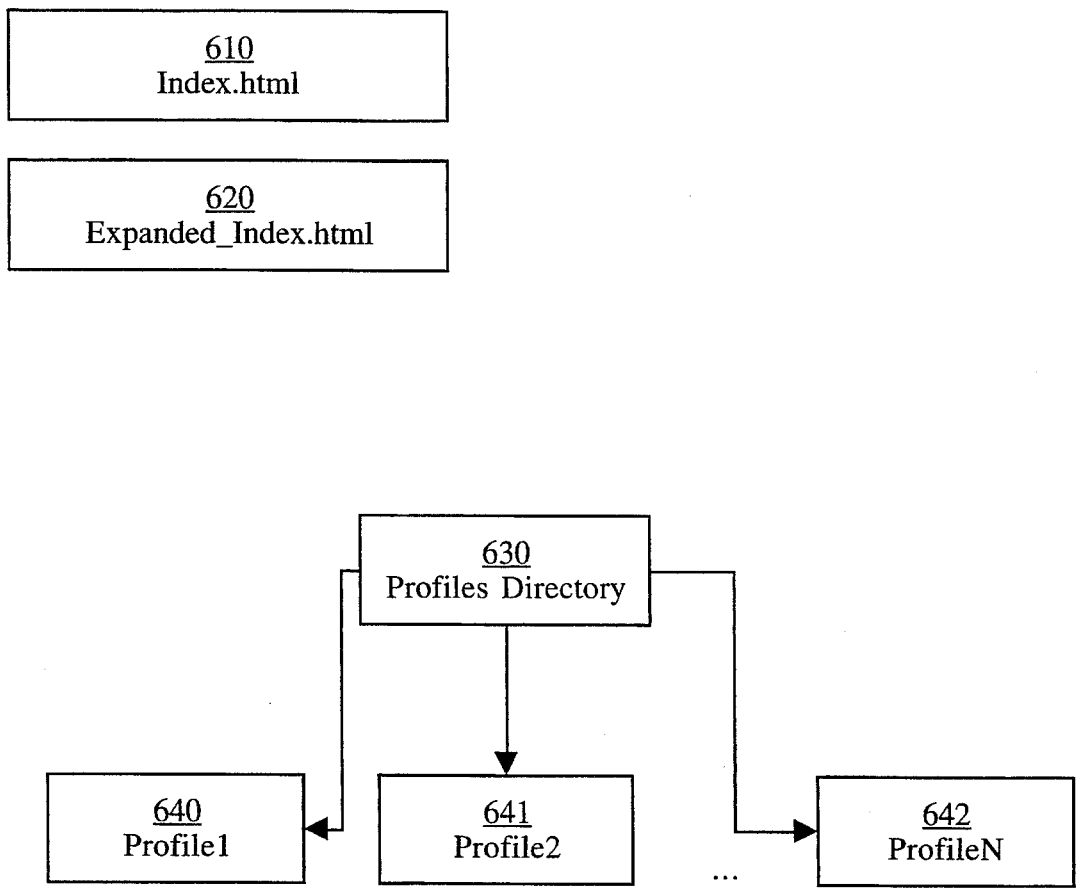
FIGS. 6a and 6b show more details of files which are created in the server.
Figure 6B:
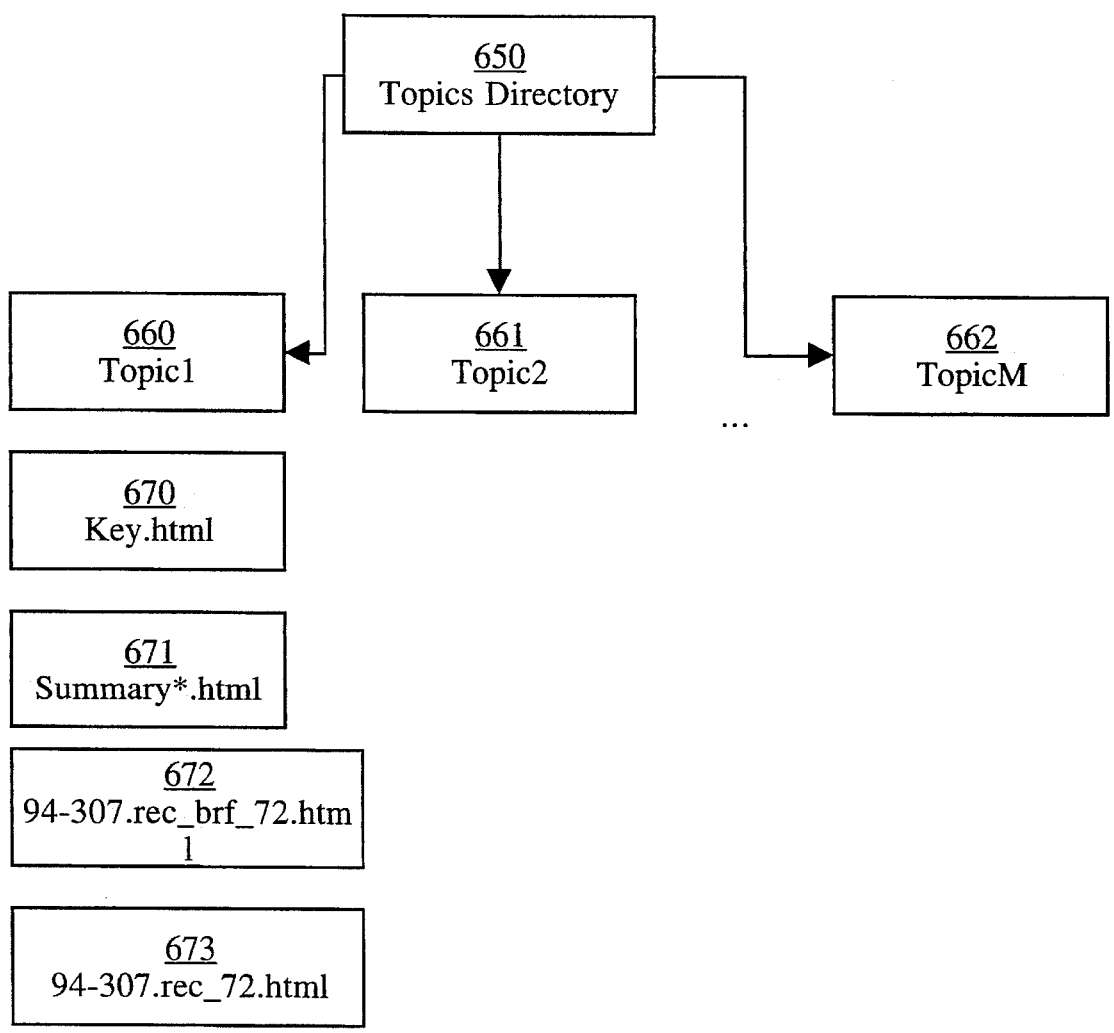

The various files created during SGML processing are shown in FIGS. 6a and 6b. In a specified directory (e.g. the root directory accessible via the Uniform Resource Locator [URL]) the html files index.html 610 and expanded_index.html 620 are stored. The index.html file 610, contains a list of all the profiles which are currently defined (as received in the SGML file). The expanded_index.html file 620, contains a list of the profiles along with their associated anchors referencing a list of abstracts (briefs) for each topic.

Theses lists of abstracts are contained in key files (e.g. 620, 630), for each topic. The index.html file 610, expanded index.html 680, and key files are all created after parsing of the article files, wherein anchors are created in the various files in order to allows hypertext cross-referencing of the various related files and/or documents. As the SGML file is parsed, profile files (lists of topics) 640, 641,642, etc. . . are created in order to keep track of profiles. These are stored in a profiles directory 630.

As shown in FIG. 6b, a topics directory 650 references each of the topics, stored as directories 660, 661,662, etc. . . In each topic directory (e.g. 660), a key file 670 is stored which contains, by topic, references to each of the articles (e.g. 673) contained within the directory. As will be illustrated below, the key file 670 contained titles represented as anchors to the articles themselves, and associated abstracts (from the brief files—e.g. 672) stored in the directory. Each brief file, such as 672, also contains an anchor to the article file. Lastly, summary files, such as summary*.html 671, are stored in the directory which contain a previous weeks' summary of titles, represented as anchors, of articles stored in the topic directory. Summary files are stored with the file specification summary<date#>.html, wherein date# is a julian date for a previous week's date. Of course, any unique file specification may be used.

The SGML file is processed twice to obtain relevant information. First, it is parsed to obtain the articles and briefs for each article. According to which profiles/topics the articles are relevant to each article and brief, directories, if required are created. The articles and briefs are then stored in to these subdirectories. A second pass of the profile and topic subdirectories causes the linkage of the index.html, expanded_index.html, key.html, and article html files for each topic for hyperlink cross-referencing. The details and mechanics of this are discussed below.

An example of a story contained within an SGML formatted message is shown as follows:

```
<rec>
<title>
BEST PRODUCTS ANNOUNCES OCTOBER SALES
</title>
<date>11-03-94<date>
<date1> Nov. 3, 1994</date1>
<brief>
<paragraph>
Best Products Co., Inc. today reported sales for fiscal
October, the four weeks ended October 29, 1994, increased
2.4% to $102.0 million compared to $99,6 million for the
four weeks ended October 30, 1993.
</paragraph>
</brief>
<source>Business Wire</source>
<fileid>b1103123.200</fileid>
<text>
<paragraph>
RICHMOND, Va. -- (BUSINESS WIRE) via First! -- Best
Products Co., Inc. (Nasdaq:BEST) today reported sales for
fiscal October, the four weeks ended October 29, 1994,
increased 2.4% to $102.0 million compared to $99.6 million
for the four weeks ended October 30, 1993. Comparable
store sales increased 0.8%
  for the same period.</paragraph>
<paragraph>
Fiscal year-to-date sales increase 4.1% to $918.7 million
for the 39 weeks ended October 29, 1994 compared to $882.7
million for the same period the prior year. Comparable
store year-to-date sales for 1994 increased 3.4% to $886.7
million compared to $857.7 million for the same period
during 1993</paragraph>
  <paragraph>
Chief Executive Officer Stewart M. Kasen said, "October
sales strengthened during the second half of the month and
met the company's expectations. Jewelry sales continued
their positive trend, along with those of housewares and
home furnishings."</paragraph>
<paragraph>
Best Products, the nation's second largest catalog
showroom retailer, operates 160 Best showrooms and 12 Best
Jewelry stores in 22 states. The company also operates a
```

-continued

```
nationwide mail-order service.</paragraph>
<paragraph>
804/261-2150
212/850-5600</paragraph>
</text>
<catalog items>
<key>Direct Marketing</key>
<key>Retail Department Stores</key>
<key>Retail Dist. Overview</key>
<profile>Sun Express News</profile>
<key>Direct Marketing</key>
<key>Catalog Sales</key>
</catalog_items>
</rec>
```

After parsing to create the profile list, the SGML file is parsed again to otain the brief and story files. HTML instances are substituted for SGML instances. Other corresponding formatting commands and/or codes may be used which correspond with those in the source language. In addition, an anchor is created referencing the article file itself, in order to allow hypertext browsing from the brief to the article itself. Anchors implemented using any number of hypertext retrieval techniques, and HTML is only discussed as one implementation. A brief file has a file name with the format:

<yr-day#.rec_brf_story#.hrml>   (e.g. 94–307.rec_brf_72.html)

Wherein day# is the julian calendar date for the year, and story# is a unique number assigned to the story as it was read from the SGML file. An example of a brief file is as follows:

```
<dl><dt><A HREF="94-307.rec_15.html">BEST
PRODUCTS
ANNOUNCES OCTOBER SALES
</A>
  <dd>
  Best Products Co., Inc. today reported sales for fiscal
  October, the four weeks ended October 29, 1994, increased
  2.4% to $102.0 million compared to $99.6 million for the
  four weeks ended October 30, 1993.
  <p>
</dl>
```

An article file is similarly created wherein SGML instances are replaced by their HTML equivalents. An article file has a file name with the format:

<yr-day#.rec_story#.html>   (e.g. 94–307.rec_72.html)

An example of an article or story file is as follows:

```
<html>
  <title>
BEST PRODUCTS ANNOUNCES OCTOBER SALES
</title>
  <h1>
BEST PRODUCTS ANNOUNCES OCTOBER SALES
</h1><p>
  <pre>
Date: 11-03-94
Source: Business Wire
FileIDL b1103123.200
</pre><p>
  <body>
  RICHMOND, Va. -- (BUSINESS WIRE) via First! -- Best
  Products Co., Inc. (Nasdaq:BEST) today repored sales for
  fiscal October, the four weeks ended October 29, 1994,
  increases 2.4% to $102.0 million compared to $99.6 million
  for the four weeks ended October 30, 1993. Comparable
  store sales incresed 0.8% for the same period.<p>
    Fiscal year-to-date sales increased 4.1% to $918.7
```

```
million for the 39 weeks ended October29, 1994 compared to
$882.7 million for the same period the prior year.
Comparable store year-to-date sales for 1994 increased
3.4% to $886.7 million compared to $857.7 million for the
same period during 1993.<p>
  Chief Executive Officer Stewart M Kasen said, "October
sales strengthened during the second half of the month and
met the company's expectations. Jewelry sales continued
their positive trend, along with those of housewares and
home furnishings."<p>
  Best Products, the nation's second largest catalog
showroom retailer, operates 160 Best showrooms and 12 Best
Jewelry stores in 22 states. The company also operates a
nationwide mail-order service.<p>
804-261-2150
212/850-5600<p>
</body>
  <!-- Start Catalog -->
  <pre>
    Profile: Sun Express News
      Topic: Direct Marketing
      Topic: Catalog Sales
  </pre>
  <!-- End Catalog -->
</html>
```

Details of a process performed for creating the profile.list (and corresponding HTML file), topic, summary, article and brief files in implemented embodiments will now be discussed with rerference to FIGS. 7a–7d. The process is implemented as an interpretative PERL script, and is idle until the expiration of a predetermined time period, step 702 (e.g. 15 minutes). Upon the expiration of this time period, it is determined whether the server has received a new mail message containing the SGML formatted text, step 704. If so, then processing of the mail message can proceed.

At step 706, the mail message is copied to a local working directory for additional processing. The file has a name with the format:

<yr-day#.sgml>  (e.g. 94–307.sgml)

The file is then parsed at step 710 to remove articles, obtain profiles/keys, and create any topic directories, if required. Subsequent to parsing of the sgml file and creation of html files, the directories are post processed at step 712 in order to create the homepage and expanded index, and provide linkage among the various article, brief, summary, topic, index, and expanded index files. Finally, at step 714, the FreeWAIS indices, used for performing keyword searching are updated to allow user searching of the profiles and topics.

Figure 7A:
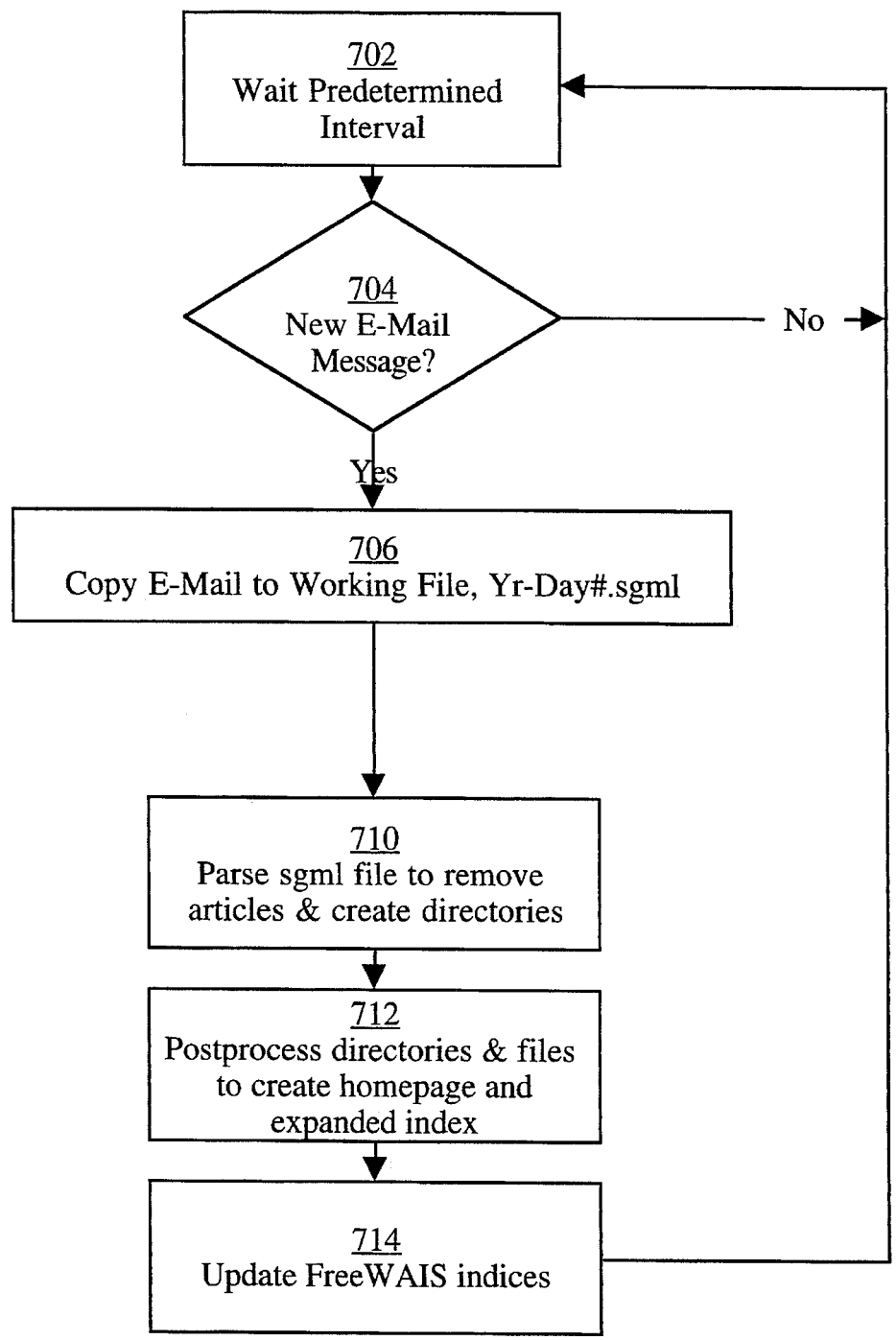
FIGS. 7a–7d shows a sequence of steps performed in the server for generation of a profile and/or creation of a personal newspaper.
Figure 7B:
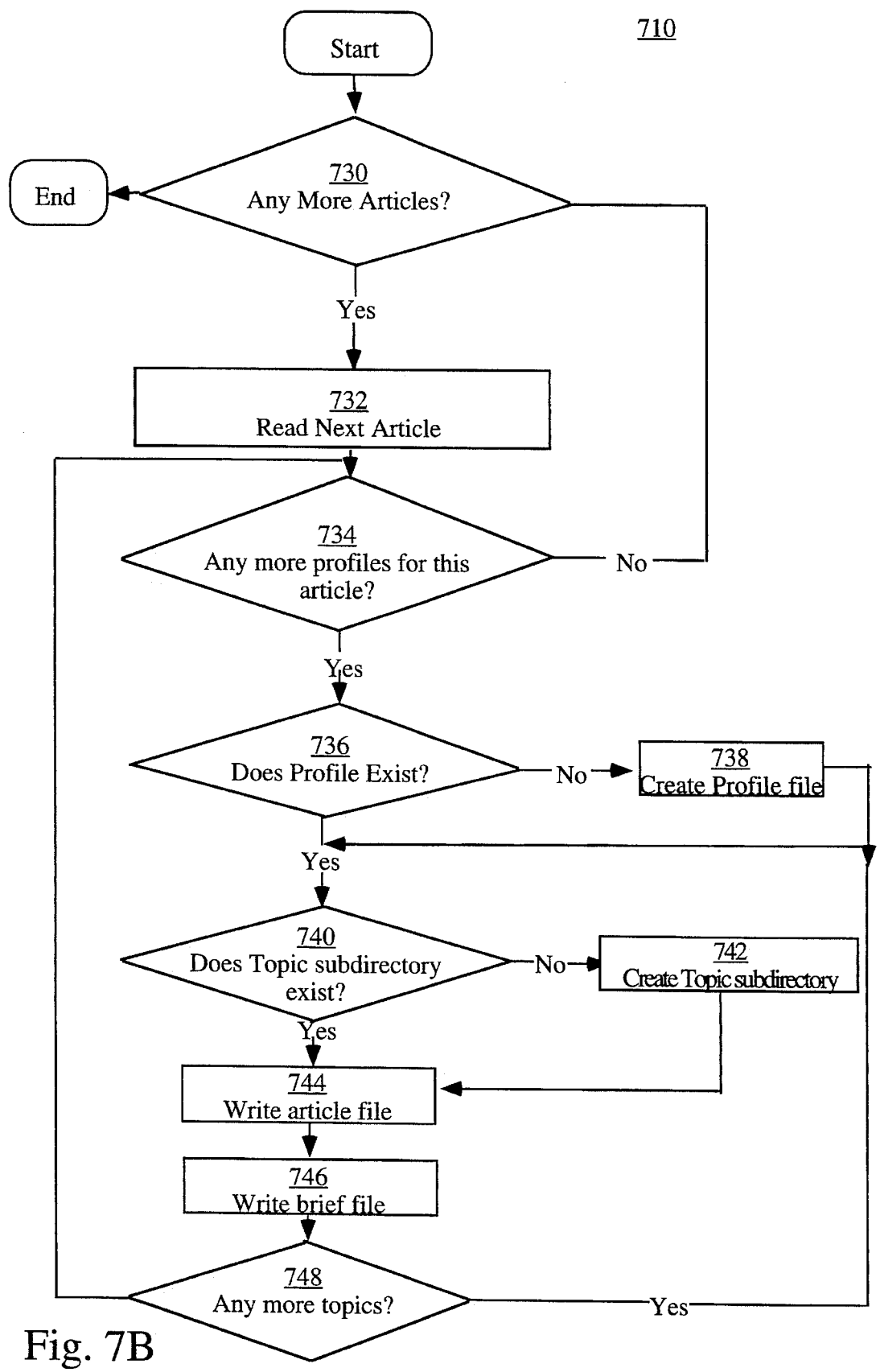

FIG. 7b shows more details of the step 710 shown in FIG. 7a. At step 730, it is determined whether there are any more article files contained within the SGML file. If not (e.g. an end-of-file condition is detected), then the process is complete. If so, however, then the next article file, including the profile/key information is read at step 732 (e.g. the next instance of <rec>). Stories are delimited by <rec></rec>. Then, the profile/key information contained within the article can be processed.

As shown in the example SGML file above, profiles are delimited by the expressions <profile></profile>. Topics are delimited by the expressions <key> </key> and follow the profile name. As shown above, profiles and keys (topics) follow each article, and are delimited by the expressions <catalog_items></catalog_items>. If there are no more profiles/topics for the article, as detected at step 734, then process 710 proceeds to step 736. If there are more profiles, then it is detected at step 736 whether a profile file exists for the profile. If not, then a profile file is created at step 738.

Then, at step 740, it is detected whether a topic subdirectory exists for the topic. If not, then it is created at step 742 and a entry is added to the profile file listing the topic in the profile file. Once the entry has been added to the profile file, and the topic subdirectory created, if required, then the article file is written at step 744, replacing all SGML instances with HTML instances. The brief file is similarly written. As shown in the example above, the brief file is delimited by <brief> </brief>. At step 748, it is detected whether any more topics defined for this profile. If so, process 710 proceeds to step 740. If not, it proceeds to step 734 for retrieval of the next profile in the article. As is evident from the flowchart, several copies of the article and corresponding brief may be created, however, as an optimization, links only may be stored in the directories to a single copy of the brief and corresponding article. Other modifications would be apparent to one skilled in the art.

Figure 7C:
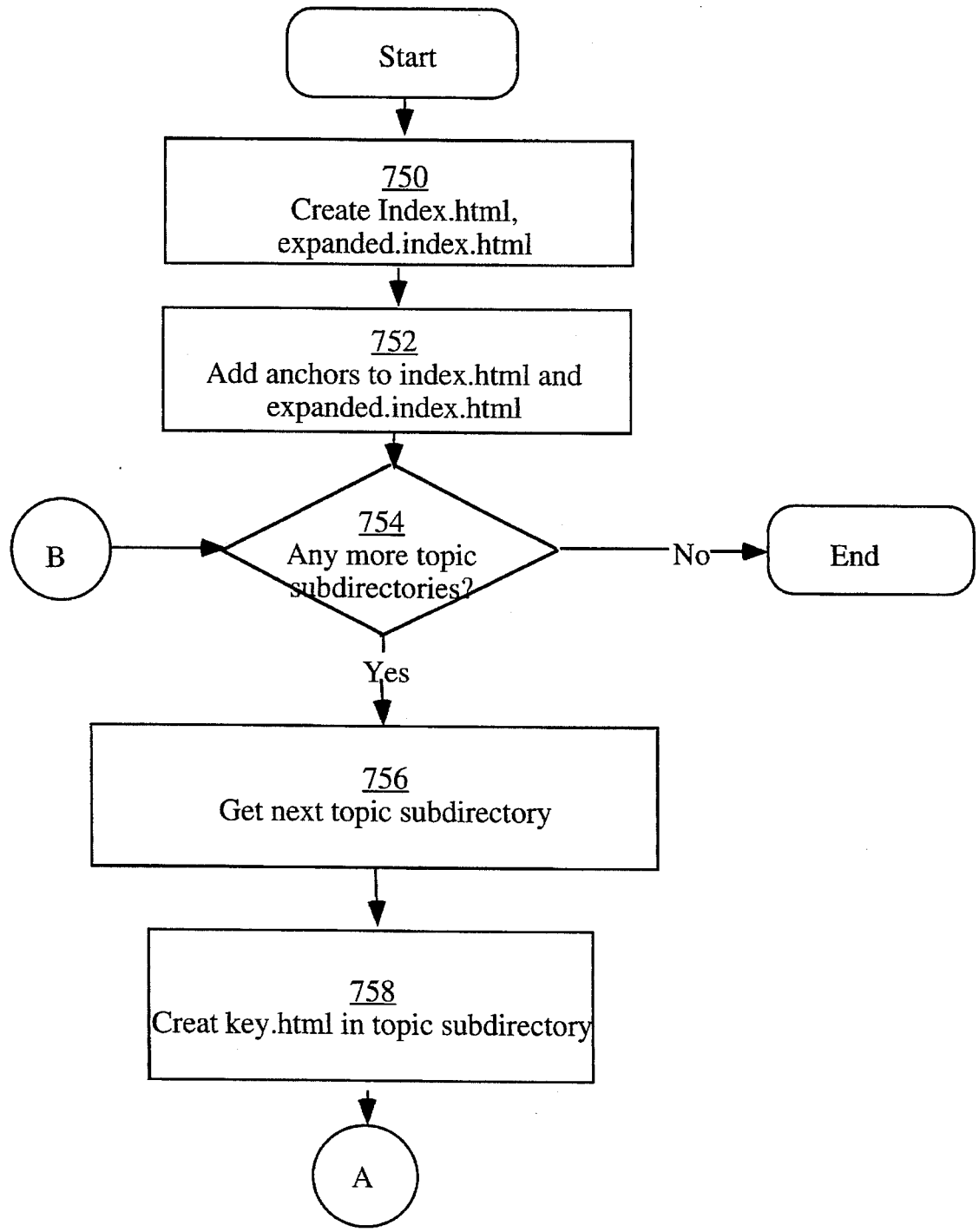
Figure 7D:
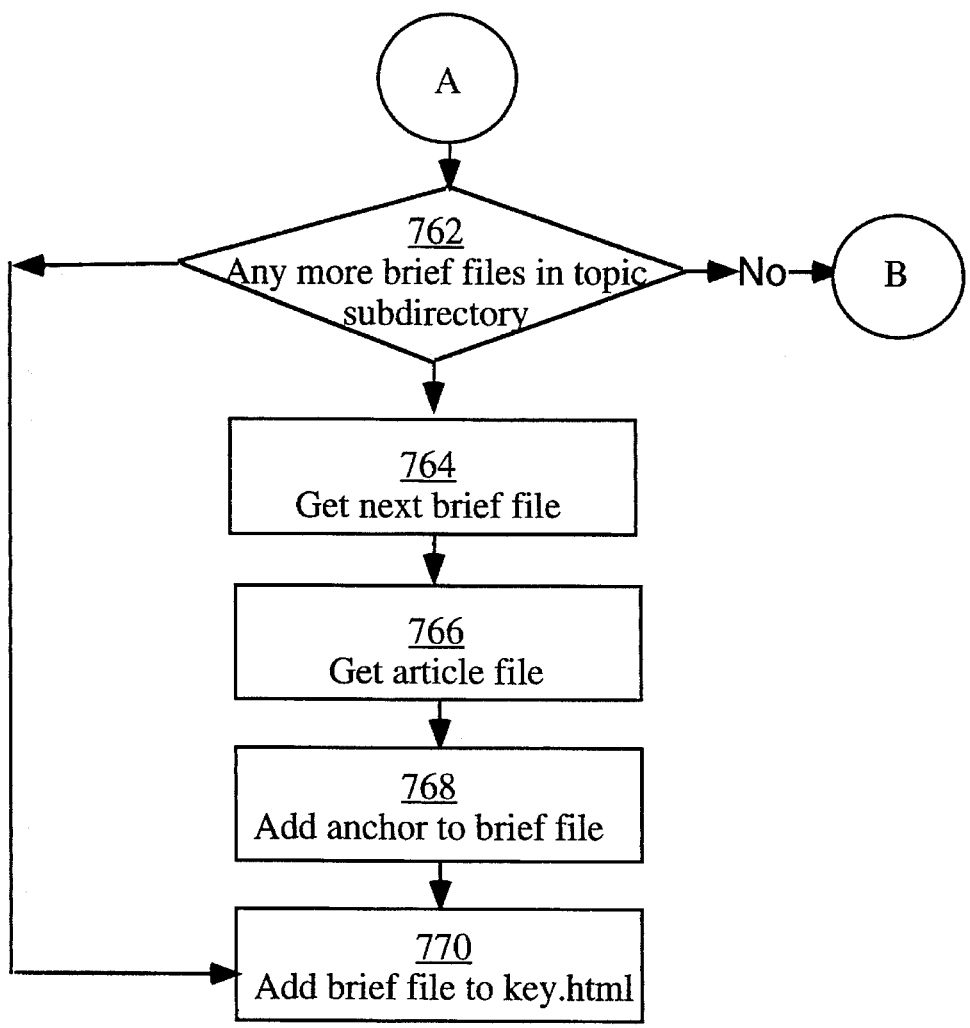

FIGS. 7c and 7d show the details of the post processing step 712. Step 712 is performed upon completion of processing of the article files from the e-mail message. Upon entry into step 712, complete profiles and associated topics are known. Thus, the Index.html and expanded_index.html files may be created at step 750. Anchors to the brief files and the corresponding articles occurs within the process at step 752. At step 754 it is determined whether there are any more topic subdirectories. If so, then the next topic subdirectory is retrieved at step 756. The key.html file (for referencing the articles) is created at step 758. The process then continues in FIG. 7d. At step 762 in FIG. 7d, it is determined whether there are any more brief files contained in the subdirectory. If not, then the process returns to step 754 of FIG. 7c. If so, then the next brief file is retrieved at step 764. The corresponding article file is then retrieved at step 766. The anchor to the article can then be added to the brief file at step 768. The brief file, including the anchor can then be inserted into the key.html file at step 770. This allows hypertext viewing of the article from the brief or key.html files via a browser. Upon completion of this processing, full hypertext browsing among the index, expanded index, topic, brief, or article files may then be accomplished.

Figure 8:
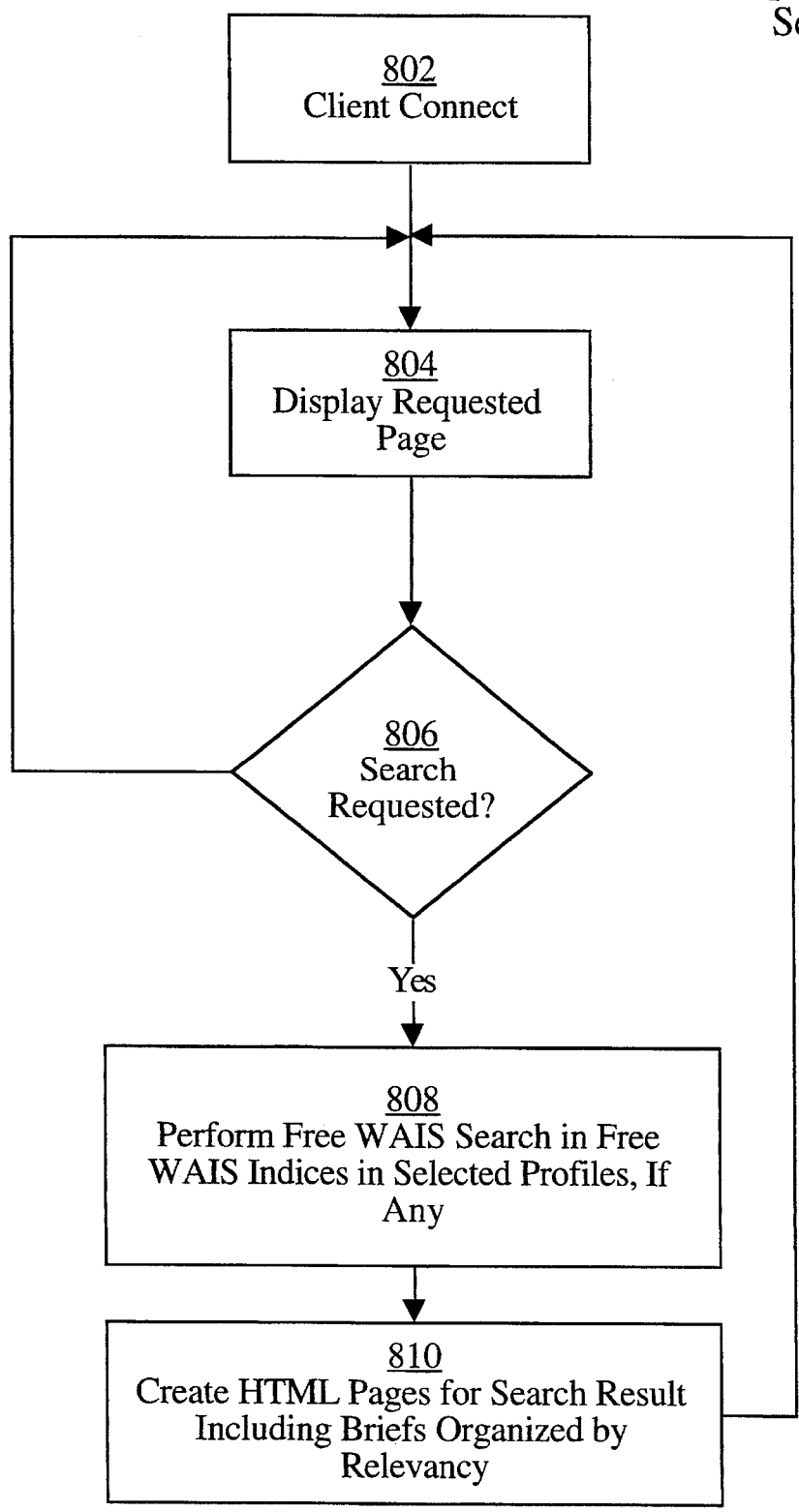
FIG. 8 shows the process performed during a user session, including the performance of any searching.

FIG. 8 shows a process for displaying/searching using the above-created HTML files, and additional files which can be created on demand, after execution of a search. A session typically commences when the HTTP server detects a request for a client connect, step 802. Then, the requested page, typically the home page, is displayed on the client browser at step 804. Any other requested page can be displayed using normal HTFP exchanges, including, the profile list (home page), the expanded profile list which includes topics arranged by profile, or any selected profile, topic, brief or story page using the above-created HTML pages. In addition, the server detects whether a search has been requested at step 806. If so, then a FreeWAIS (inverted index) search is performed, at step 808, in the selected profiles, if any. At step 810, HTML page(s) containing the results of the search are generated, including story brief, and titles, organized by relevancy. Relevancy may include any number of factors, including but not limited to, primacy, and number of occurrences, in this order. Other, more sophisticated, relevancy measures may also be used. The story headings are displayed as anchors which reference the stories themselves. Upon completion of the search, the request page(s) are again displayed, in this case the search results at step 804.

FIGS. 9a and 9b show a scrollable display which is displayed as the main home page HTML file. A search field 910, which allows user input at any time using fill-in forms support under HTTP is displayed for FreeWAIS searching at any time in the selected profile(s). Each of the profile names (e.g. 920, 921, etc.) are selectable as anchors as profiles for the search or for referencing the expanded home page (FIG. 10).

The expanded home page display is shown in FIG. 10. This includes profile headings (e.g. 1020. 1030) and corresponding topic anchors (1021, 1022, 1023, and 1031) for access to the topic main pages. Again, the expanded home page is searchable by entering text into field 1010.

Figure 11C:
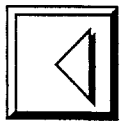

FIGS. 11a–11c include a scrollable display which shows the Topic Summary page accessible by selecting any of the topic anchors shown in FIG. 10. This includes the topic heading 1100, and anchor 1101 to the previous topic, if any, for the profile. This also includes a next topic anchor 1102, and a return to profile page for returning to the home page shown in FIG. 9. Anchors for story headings 1111, 1112, etc. . . are present for access to the stories themselves. The display also includes the brief for each story (e.g. 1121). A previous days headings only (1130, 1131, etc. . .) are shown and allow access to those stories, as shown in FIG. 11b. Anchor 1140 of FIG. 11c allows the access of an HTML page for a previous week's stories for the given topic, if any.

FIGS. 12a and 12b show the results of a FreeWAIS search, as described above. The search term(s) are shown in field 1200, and story headings (e.g. 1202), which act as anchors to the story pages themselves, are shown sorted by relevancy. The relevancy Score, including the date, is shown as 1201 for each article. The text from the brief HTML file is shown as 1203.

Lastly, story text is displayed on a page such as that shown in FIG. 13. 1300 includes the story title, 1301 includes identifying information regarding the story, and 1302 shows the story text itself.

Thus, a method and apparatus for a retrieving information has been described. Note that though the foregoing has particular utility and has been described with reference to certain specific embodiments in the figures and the text, that one may practice the present invention without implementing all of these specific details. Thus, the figures and the text are to be viewed in an illustrative sense only, and not limit the present invention. The present invention is only to be limited by the appended claims which follow.

What is claimed is:

1. A computer-implemented method of retrieving information comprising the following steps:
   a. receiving a first file of information which includes a first markup language to identify contents of said information;
   b. responsive to said receiving said first file of information, parsing said first file of information to generate a list of profiles, and at least one corresponding topic for each of said list of profiles;
   c. generating a second file in a second markup language containing said list of said profiles and at least one corresponding third file in a third markup language for said at least one corresponding topic for each of said list of profiles, wherein said second file contains anchors referencing each at least one corresponding third file, and first markup instances in said first file of information are converted to second markup instances in either said second file or said third file;
   d. parsing said first file of information to determine said at least one article, if any, for said each at least one corresponding topic for said each of said list of profiles, and a corresponding brief for said at least one article; and
   e. generating a fourth file and a fifth file for said at least one article, if any, for said each at least one corresponding topic for said each of said list of profiles, said fourth file including a brief of each said at least one article in said first file of information and an anchor to said fifth file, said fifth file including text for said at least one article, if any, for said each at least one corresponding topic for said each of said list of profiles.

2. The method of claim 1 further comprising the step of generating a sixth file which contains a plurality of anchors referencing a plurality of said fifth files, wherein said anchors in said sixth file are arranged by each said profile and corresponding topic.

3. The method of claim 1 wherein said step of receiving said first file of information includes receiving an electronic mail (e-mail) message.

4. The method of claim 1 further comprising the step of creating a directory for each of said list of said profiles and at least one subdirectory for said at least one corresponding topic for each of said list of profiles, and storing said third and fifth file for said at least one article, if any, for said each at least one corresponding topic for said each of said list of profiles in said subdirectory.

5. The method of claim 1 wherein said generating said at least one corresponding third file for said at least one corresponding topic for each of said list of profiles, includes generating a first level heading for each of said list of profiles, and generating a second level heading for said at least one corresponding topic for each of said list of profiles.

6. The method of claim 5 wherein said second level heading for said at least one corresponding topic for each of said list of profiles comprises an anchor referencing said fifth file.

7. A computer-implemented method of retrieving information comprising the following steps:
   a. parsing a first file of information to generate a list of profiles, and at least one corresponding topic for each of said list of profiles;
   b. generating a second file containing said list of said profiles and said at least one corresponding topic for each of said list of profiles;
   c. parsing said first file of information to determine said at least one article, if any, for said each at least one corresponding topic for said each of said list of profiles;
   d. generating a third file for said at least one article, if any, for said each at least one corresponding topic for said each of said list of profiles, said third file including text for said at least one article, if any, for said each at least one corresponding topic for said each of said list of profiles; and
   e. inserting an anchor in said second file referencing said third file for said at least one article, if any, for said each at least one corresponding topic for said each of said list of profiles.

8. The method of claim 7 further comprising the step of receiving said first file of information in an electronic mail (e-mail) message.

9. The method of claim 7 wherein said inserting an anchor in said second file referencing said third file for said at least one article, if any, for said each at least one corresponding topic for said each of said list of profiles includes generating a first level heading for each of said list of profiles, and generating a second level heading for said at least one corresponding topic for each of said list of profiles, wherein said second level heading includes a first anchor referencing said third file.

10. A computer-implemented method of retrieving information comprising the following steps:

a. using a hypertext transfer protocol, displaying to a user a display generated from a first markup language, containing a list a profiles, and at least one corresponding topic for each of said list of profiles;

b. allowing a user to select via said hypertext transfer protocol a first plurality of said at least one corresponding topic for a second plurality of said list of profiles:

c. allowing said user to enter via said hypertext transfer protocol at least one search term: and d. executing a search using said search term in a first database of information, said first database of information organized by said list of said profiles, and said at least one corresponding topic for each of said list of profiles, wherein said search is performed in locations in said first database of information which correspond with each of said first plurality of said at least one corresponding topic for said second plurality of said list of profiles.

11. The method of claim 10 further comprising the step of displaying, via said hypertext transfer protocol, results of said search using said search term in said first database, said results of said search including a first display generated from a first markup language file representing said results of said search, said first markup language file including at least one anchor, wherein said each at least one anchor references a second file containing text which includes said search term for each article for one of said first plurality of said at least one corresponding topic for said second plurality of said list of profiles.

12. The method of claim 10 wherein said step of executing said search using said search term in said first database of information includes performing a FreeWAIS search of said first database.

* * * * *